(12) United States Patent
Huang et al.

(10) Patent No.: US 7,113,461 B2
(45) Date of Patent: Sep. 26, 2006

(54) CIRCUIT FOR TRACKING ERROR SIGNAL DETECTION ON AN OPTICAL STORAGE MEDIUM

(75) Inventors: Chih-Chien Huang, Hsinchu (TW); Yuh Cheng, Hsinchu (TW); Nai-Heng Tseng, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 674 days.

(21) Appl. No.: 10/601,642

(22) Filed: Jun. 24, 2003

(65) Prior Publication Data

US 2004/0160866 A1    Aug. 19, 2004

(30) Foreign Application Priority Data

Feb. 14, 2003  (TW) ............... 92103122 A

(51) Int. Cl.
G11B 7/00    (2006.01)
(52) U.S. Cl. ............................... 369/44.34; 369/44.41; 369/53.23

(58) Field of Classification Search .................. None
See application file for complete search history.

(56) References Cited

U.S. PATENT DOCUMENTS 4,583,209 A *   4/1986  Bierhoff ................. 369/44.41
6,137,755 A    10/2000  Bakx et al.
6,236,628 B1 *  5/2001  Kim ....................... 369/44.41

FOREIGN PATENT DOCUMENTS

WO    WO8605914 A  * 10/1986

* cited by examiner

*Primary Examiner*—Jorge L. Ortiz-Criado
(74) *Attorney, Agent, or Firm*—Birch, Stewart, Kolasch & Birch, LLP

(57) ABSTRACT

A circuit for tracking error signal detection on an optical storage medium, which has a plurality of digitizers, a plurality of logic comparators and a difference amplifier, is disclosed. The circuit involves summing the signals to be compared and obtaining a delay signal via a delayer. Therefore, the phase difference of the signals is detected via the delay signal to obtain the tracking error signal of the optical storage medium.

10 Claims, 8 Drawing Sheets

CIRCUIT FOR TRACKING ERROR SIGNAL DETECTION ON AN OPTICAL STORAGE MEDIUM

BACKGROUND OF THE INVENTION

1. Field of Invention

The invention relates to a method for signal detection and obtaining, and more particularly to a method to obtain a tracking error signal of an optical storage medium.

2. Related Art

The positions of tracks are determined by the phase difference of signals detected by photo detectors. Regarding the high-density optical record medium, in U.S. Pat. No. 6,137,755 (Deriving a tracking error signal from a time difference between detector signals) discloses a circuit for obtaining the tracking error signal in order to increase the reliability of the signal.

The circuitry is shown in FIG. 1. A first summing signal F1 is input into a slicer 12 via a capacitor 11, the input terminal of which couples a resistor 13 to a ground to generate a suitable slicing voltage level. The signal S1 from the slicer 32 is input to the first input of a logic comparator (EXOR) 14, which produces a comparing signal A. After a lowpass filer including a resistor 15 and a capacitor 16 deals with the comparing signal A, the signal A is then input to a negative terminal of a difference amplifier 18 via a resistor 17. The signal from the difference amplifier 18 is the tracking error signal TE. Similarly, a second summing signal F2 is input to the positive terminal of the difference amplifier 39 via a capacitor 21, a slicer 22, a resistor 23, a logic comparator 24, a lowpass filter including a resistor 25 and a capacitor 26, and a resistor 27. The positive terminal of the difference amplifier 18 couples a resistor 28 to the ground. The circuit further comprises a delayer 20 to obtain a delay signal S1$d$, which is input to the second input of the logic comparator 14 and the logic comparator 24 respectively.

Using the first summing D1 to obtain the delay signal S1$d$, which is used to acquire the phase error, creates a problem. The frequency at which the delay signal S1$d$ is acquired is cause for concern. As shown in FIG. 2, when the delay signal S1$d$ is too small or too large, the range of the delay signal S1$d$ is between Tp and 3T-Tp.

The pulse width of the signal for detecting the phase difference becomes wider if the delay signal S1$d$ is larger. The phase-comparing circuit is easily implemented in this situation. If the delay is 3T-Tp, the pulse width from the phase comparator is 3T-2Tp. If the increasing frequency is caused by high-density data or high accessing speed, handling the frequency of the signal becomes difficult.

The method employs only one signal to obtain the delay signal, which is used to detect the lead and the lag of the signals. Thus, the method disclosed in U.S. Pat. No. 6,137,755 needs improvement because the reliability of the delay range is lower.

SUMMARY OF THE INVENTION

A main object of the invention is to provide a circuit for tracking error signal detection on an optical storage medium to increase the reliability of the tracking error signal.

The first preferred embodiment of the invention involves a first summing signal and a second summing signal in order to generate the tracking error signal. The circuit of the first preferred embodiment includes a plurality of digitizers, a delayer, a plurality of logic comparators and a difference amplifier.

The digitizers are employed for outputting the first summing signal and the second summing signal as a first digital summing signal and a second summing signal respectively, and outputting a third digital summing signal according to a third summing signal, which is generated according to the first summing signal and the second summing signal. The delayer generates a delay signal according to the third digital summing signal. The logic comparators compare the delay signal with the first digital summing signal, and then output a first comparing signal. A second comparing signal is also generated after comparing the delay signal with the second digital summing signal. The difference amplifier generates the tracking error signal according to the first comparing signal and the second comparing signal.

The second preferred embodiment of the invention involves a first signal, a second signal, a third signal and a fourth signal to generate the tracking error signal. The circuit of the second preferred embodiment includes a plurality of digitizers, a plurality of delayers, a plurality of logic comparators and a difference amplifier.

The digitizers are adopted for outputting the first signal, the second signal, the third signal and the fourth signal as a first digital signal, a second digital signal, a third digital signal and a fourth digital signal respectively. A first digital summing signal and a second digital summing are also digitized according to a first summing signal and a second summing signal respectively. The first summing signal is generated according to the first signal and the second signal. The second summing signal is generated according to the third signal and the fourth signal. The delayers generate a first delay signal and a second delay signal according to the first digital summing signal and the second digital summing signal respectively. The logic comparators compare the first delay signal with the first digital signal, the first delay signal with the second digital signal, the second delay signal with the third digital signal, and the second delay signal with the fourth digital signal respectively. Then the logic comparators output a first comparing signal, a second comparing signal, a third comparing signal and a fourth comparing signal accordingly. Finally, the difference amplifier generates the tracking error signal according to the first comparing signal, the second comparing signal, the third comparing signal and the fourth comparing signal.

The third preferred embodiment of the invention involves a first signal, a second signal, a third signal and a fourth signal to generate the tracking error signal. The circuit of the third preferred embodiment includes a plurality of digitizers, a delayer, a plurality of logic comparators and a difference amplifier.

The digitizers are adopted for outputting the first signal, the second signal, the third signal and the fourth signal as a first digital signal, a second digital signal, a third digital signal and a fourth digital signal respectively. A digital summing signal is also digitized according to a summing signal. The summing signal is generated according to the first signal, the second signal, the third signal and the fourth signal. The delayer generates a delay signal according to the digital summing signal. The logic comparators compare the delay signal with the first digital signal, the second digital signal, the third digital signal, and the fourth digital signal respectively. Then the logic comparators output a first comparing signal, a second comparing signal, a third comparing signal and a fourth comparing signal accordingly. Finally, the difference amplifier generates the tracking error signal according to the first comparing signal, the second comparing signal, the third comparing signal and the fourth comparing signal.

In the optical disk system, the photo detector of the pickup head is divided into four regions: A, B, C, and D. When the pickup head is crossing tracks, the detected signals from region A, B, C or D either lead or lag. Therefore, the position of the track can be detected by the phase difference of the signals from the different regions. First, the detected signals from region A and region B are digitized. It follows to sum the detected signals and then to digitize the summing signal. The digitized signal is delayed for a delay time Td to get a delay signal, which is employed to compare the phase of the digitized signals. The signals are filtered by lowpass filters such that the quality of the tracking error signals is not affected by the delay time Td.

In the following paragraphs, we compare the disclosed method with the prior art.

The disclosed method involves adding two analog signals to be compared, which are then digitized and delayed to obtain the phase difference of the two analog signals. In the edge of the track, some signals are weak, or even lower than the threshold voltage for signal digitizing. In case the signal is adopted to acquire the tracking error signal, it causes a leading phase of 180 degrees or a lag phase of 180 degrees in the U.S. Pat. No. 6,137,755. The disclosed method improves this drawbackby generating a reference signal from two analog signals, and the reference signal is balanced for two analog signals. The delay range is consequently improved. The delay range is between Tp/2 and 3T-Tp/2. The range increases for a Tp. In the situation of the same delay signal, the reliability of the disclosed method is better than that in the U.S. Pat. No. 6,137,755, the frequency is lower, and the circuit is easily implemented. In prior art, the delay needs precise control if requiring a signal with lower frequency. Otherwise, the tracking signals are affected.

According to the method of the invention, the delay scope is between Tp/2 and 3T-Tp/2. In the situation of a delay equaling Tp/2, the shortest pulse width output by the phase comparator is 3T-Tp. The pulse width is wider than that of U.S. Pat. No. 6,137,755. The required bandwidth of the comparator is lower. The control of the delay is simplified by making sure that the delay is greater than Tp/2. 3T is not taken into consideration. Therefore, lowering the frequency of the signal is achieved.

The disclosed method increases the usable scope of the delay signal. Not only is the control of the delay simplified, but the required bandwidth of the comparator is also reduced. Furthermore, the reliability of the tracking signal is improved.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

In the optical storage system, the photo detector of the pickup head is divided into four regions: A, B, C and D, and two axis: tangential and radial, as shown in FIG. 3.

When the pickup head is crossing tracks, the detected signals from region A, B, C or D either lead or lag. Therefore, the position of the track is determined by the phase difference of the first signal SA and the second signal SB.

First, the circuit digitizes the first signal SA from region A and the second signal SB from region B, while the summing signal SA+SB is also digitized. The summing signal is then delayed for a time Td to get a delay signal. The delay signal is used to compare the phase difference of the first signal SA and the second signal SB. The compared signal is filtered by a lowpass filter such that the quality of the tracking error signal is not affected by the delay time Td.

Figure 1:
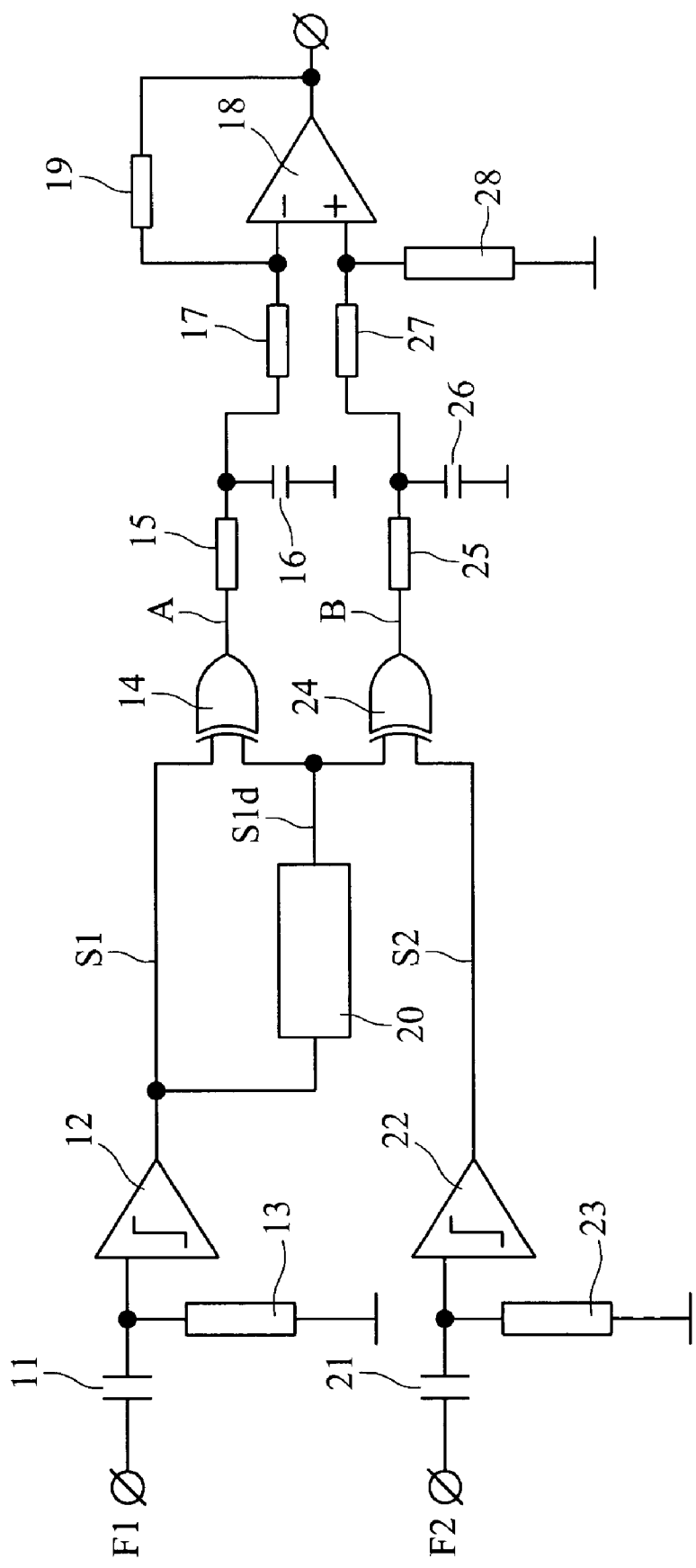
FIG. 1 is the block diagram of the circuit of the prior art for obtaining the tracking error signal.
Figure 2:
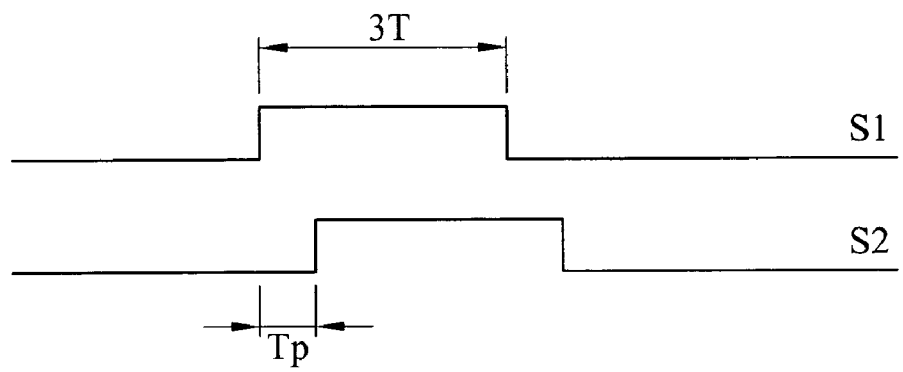
FIG. 2 is the schematic diagram of the delay signal of the prior art.
Figure 3:
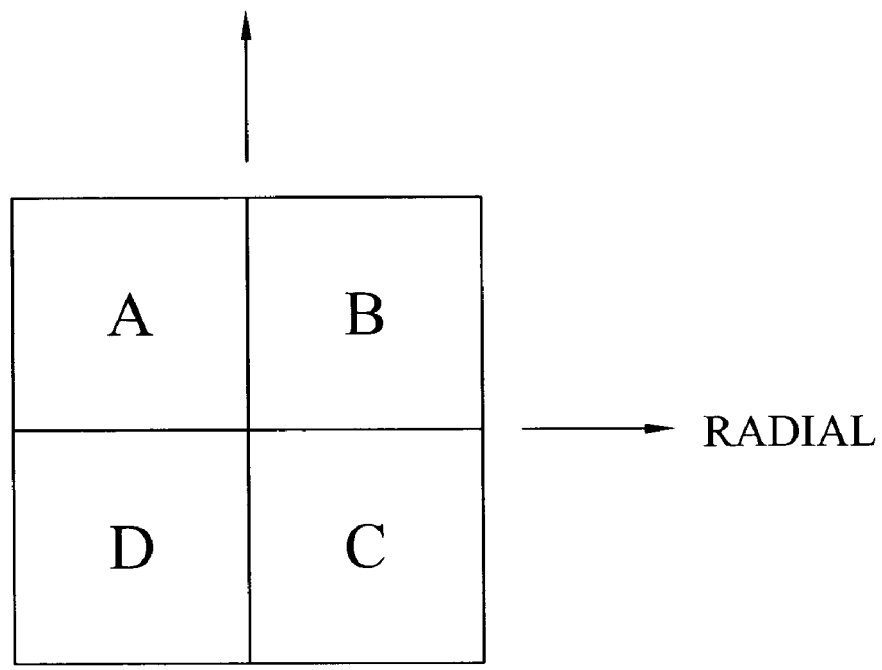
FIG. 3 is the schematic diagram of photo detectors.

When crossing tracks in the radial direction in FIG. 3, the phase (or time) of the detected lights from the photo detectors either lead or lag. When the laser beams deviate from the left side of the track (X>0), the phase of the first signal SA leads the phase of the second signal SB, and the phase of the third signal SC leads the phase of the fourth signal SD. When the laser beams deviate from the right side of the track (X<0), the phase of the second signal SB leads the phase of the first signal SA, and the phase of the fourth signal SD leads the phase of the third signal SC. Not only DTD2: TE=[φ(A+C)]−[φ(B+D)], but also DTD4: TE=[φ(A)−φ(B)]+[φ(C)−φ(D)] is employed to determine the tracking signal.

Figure 4:
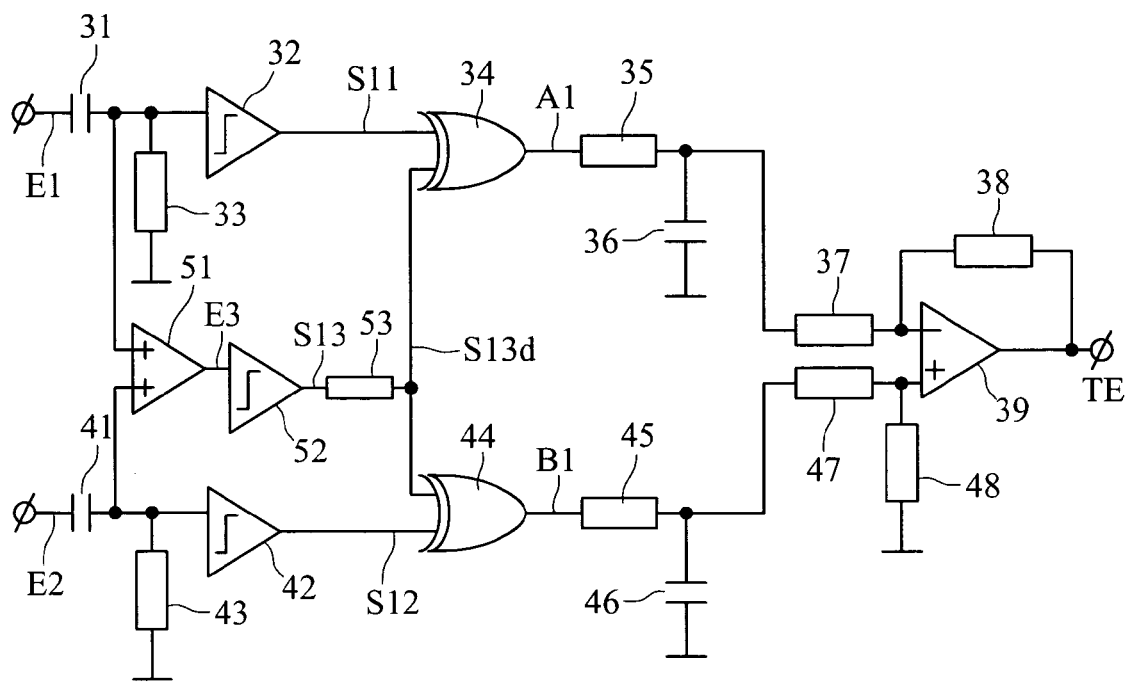
FIG. 4 is the block diagram of the circuit of the invention.

FIG. 4 describes the circuit for tracking error signal detection on an optical storage medium of the invention, which employs DTD2: TE=[φ(A+C)]−[φ(B+D)] to obtain the tracking error signal TE. A first summing signal E1 (=SA+SC, which equals the sum of the first signal SA and the third signal DC) is input into a slicer 32 via the input terminal of a capacitor 31, the input terminal of which couples a resistor 33 to a ground to generate a suitable slicing voltage level. The slicer 32, the capacitor 31 and the resistor 33 form a digitizer for digitizing the first summing signal E1. The slicer, the capacitor and the resistor in the following embodiment are the same as those in this embodiment.

The first digital summing signal S11 from the slicer 32 is input to the first input terminal of a logic comparator (EXOR) 34, which produces a first comparing signal A1. After a lowpass filer including a resistor 35 and a capacitor 36 deals with the first comparing signal A1, the signal A1 is then input into a negative terminal of a difference amplifier 39 via a resistor 37. The signal from the difference amplifier 39 is the tracking error signal TE. The tracking signal TE is fed back to the negative terminal of the difference amplifier 39 via a resistor 38. Similarly, a second summing signal E2 (=SB+SD, which equals the sum of the second signal SB and the fourth signal SD) is digitized as a second digital summing signal S12 via a capacitor 41, a slicer 42 and a resistor 43. The second digital summing signal S12 is then input into a logic comparator 44, which generates a second comparing signal B1. At last, the second comparing signal B1 is input into the positive terminal of the difference amplifier 39 via a lowpass filter including a resistor 45 and a capacitor 46. The positive terminal of the difference amplifier 39 couples a resistor 48 to the ground. The circuit further comprises an adder 51 for adding the first summing signal E1 and the second summing signal E2 such that a third summing signal E3 (E3=E1+E2) is obtained. The third summing signal E3 is output as a third digital summing signal S13, which is then input into a delayer 53 to obtain a delay signal S13$d$. The delay signal S13$d$ is input into the second input terminal of the logical comparator 34 and the logical comparator 44. The delay signal from the delayer is only related to the third summing signal S13, and is irrelevant to the other signals. After the logic comparator 34 compares the delay signal 34 with the first comparing signal A1 and the logic comparator 44 compares the delay signal with the second comparing signal, the phase difference of S11 and S12 is obtained.

Figure 5:
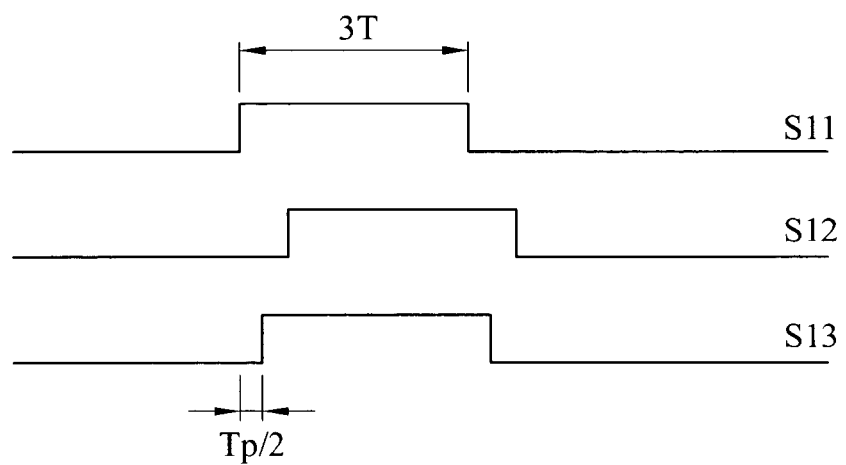
FIG. 5 is the schematic diagram of the delay signal of the invention.

The comparing signal of the invention is generated from two signals, so the stability of the signal is better than that in U.S. Pat. No. 6,137,755. The shortest pulse width from the phase comparator is 3T-Tp, which is higher than that of U.S. Pat. No. 6,137,755. The frequency is also lower. The circuit is easily implemented owing to these advantages. In the prior art, the delay needs to be better controlled in order to get signals that are not too high. Otherwise, the tracking signal is affected. As illustrated in FIG. 5, the delay range is between Tp/2 and 3T-Tp/2. The delay is better with a small range. When the delay is Tp/2, the shortest pulse width from the photo detector is 3T-Tp, which is higher than that of U.S. Pat. No. 6,137,755. The delay control becomes easier, because it is only necessary to keep the delay greater than Tp/2. The affect of 3T is not taken into consideration.

Figure 7:
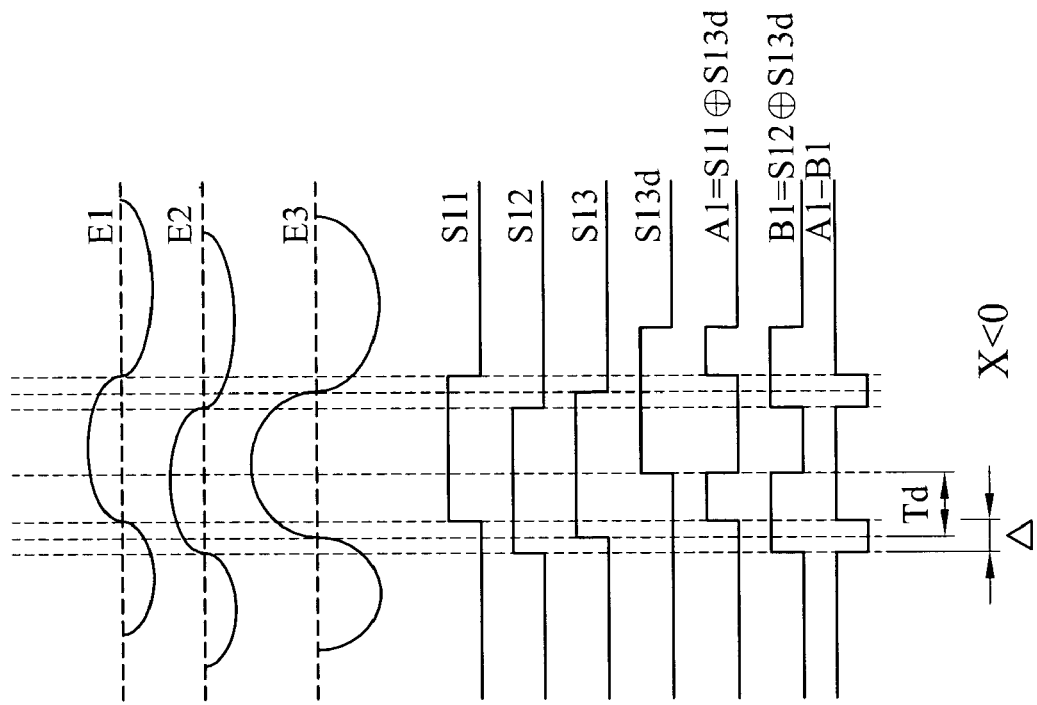
FIG. 7 shows the clock of the signals when x<0 with the DTD2 method.
Figure 6:
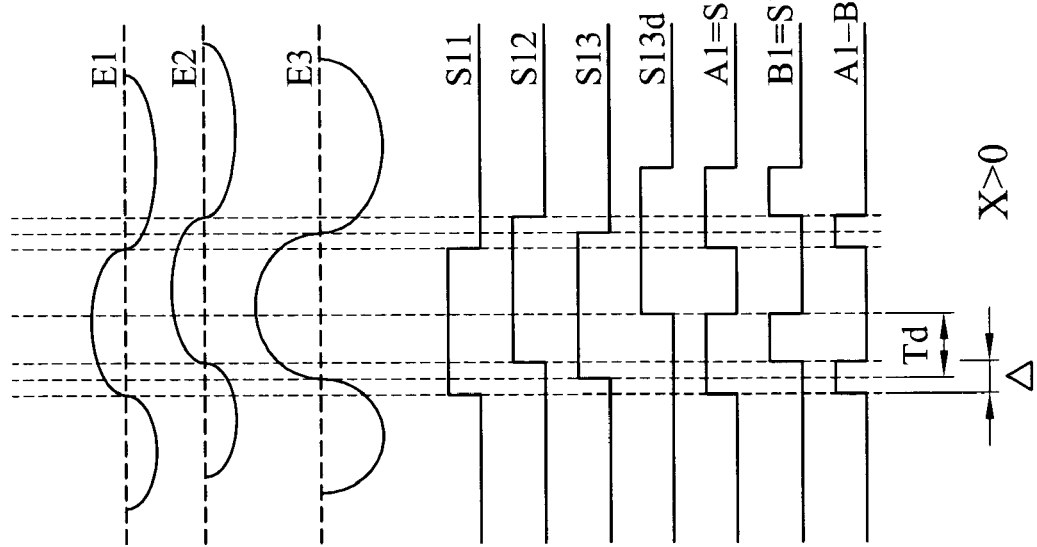
FIG. 6 shows the clock of the signals when x>0 with the DTD2 method.

FIG. 6 illustrates the phase difference of the circuit of FIG. 4 when x>0 during operation. The first summing E1, the second summing signal E2 and the third summing signal E3 are similar to sine waves. The digitized waveforms are illustrated as S11, S12 and S13. The waveform of the delay signal of the third digital summing signal S13 is shown as S13$d$. The delay time is Td. The phase difference of the first summing signal E1 and the second summing signal E2 is Δ, which is also the phase difference of the first digital summing signal S11 and the second digital summing signal S12. The first comparing signal A1 is obtained through EXOR computation of the first digital summing signal S11 and the delay signal S13$d$, while the second comparing signal B1 is obtained through EXOR computation of the second digital summing signal S12 and the delay signal S13$d$. Therefore, when x>0, the phase difference Δ of the signal A1 subtracting the signal B1 is a positive pulse, which is the same as the phase difference of the first digital summing signal S11 and the second digital summing signal S12. The phase difference when x<0 is shown in FIG. 7. The first summing signal E1 leads the second summing signal E2. Therefore, when x<0, the phase difference Δ of the first comparing signal A1 subtracting the second comparing signal B1 is a negative pulse, which is the same as the phase difference of the first digital summing signal S11 and the second digital summing signal S12.

Figure 8:
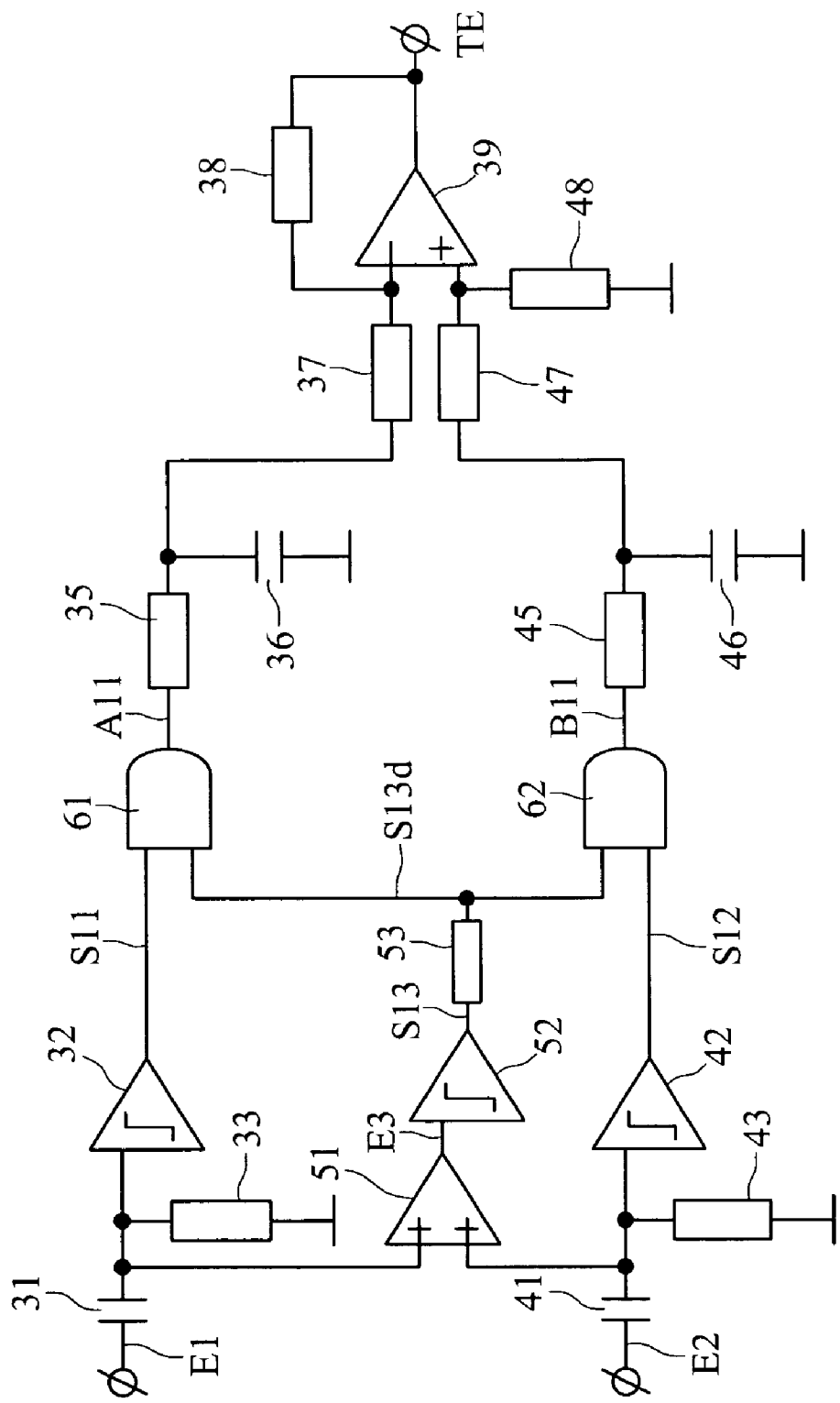
FIG. 8 is the block diagram of the circuit of the second preferred embodiment of the invention.

Refer to FIG. 8 illustrating the second preferred embodiment of the invention. In this embodiment, the first digital summing signal S11 and the second digital summing signal S12 are compared when the delay signal S13$d$ is at a high level. The first comparing signal A11 is obtained from AND computation of the first digital summing signal S11 and the delay signal S13$d$ performed by the logic comparator 61. The second comparing signal B11 is obtained from AND computation of the second digital summing signal S12 and the delay signal S13$d$ performed by the logic comparator 62. The purpose of using the AND comparator is to use the delay signal S13$d$ to determine whether to compare S11 and S13. When S13$d$ is at a high level, A11 and B11 are delivered, and then compared by the difference amplifier 39, which outputs the tracking error signal through a lowpass filter.

Figure 10:
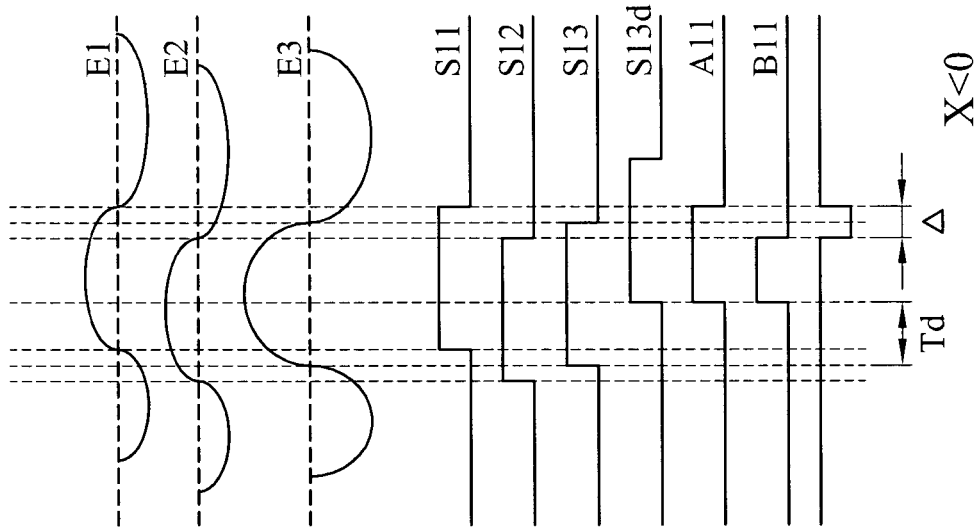
FIG. 10 shows the clock of the signals when x<0 with the DTD2 method of the second preferred embodiment.
Figure 9:
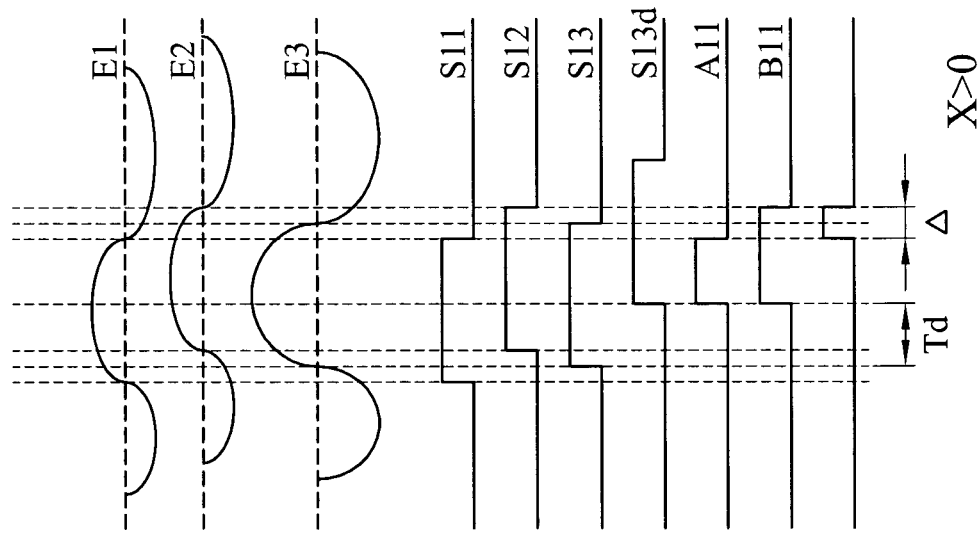
FIG. 9 shows the clock of the signals when x>0 with the DTD2 method of the second preferred embodiment.

FIG. 9 illustrates the phase difference of the circuit of FIG. 8 when x>0 during operation. The first summing signal E1, the second summing signal E2 and the third summing signal E3 are similar to sine waves. The digitized waveforms are illustrated as S11, S12 and S13. The waveform of the delay of the third digital summing signal S13 is shown as S13$d$. The delay time is Td. The phase difference of the first summing signal E1 and the second summing signal E2 is Δ, which is also the phase difference of the first digital summing signal S11 and the second digital summing signal S12. The first comparing signal A11 is obtained through AND computation of the first digital summing signal S11 and the delay signal S13$d$, while the second comparing signal B1 is obtained through AND computation of the second digital summing signal S12 and the delay signal S13$d$. Therefore, when x>0, the phase difference Δ of the signal A11 subtracting the signal B11 is a positive pulse, which is the same as the phase difference of the first digital summing signal S11 and the second digital summing signal S12. The phase difference when x<0 is shown in FIG. 10. The first summing signal E1 leads the second summing signal E2. Therefore, when x<0, the phase difference Δ of the first comparing signal A11 subtracting the second comparing signal B11 is a negative pulse, which is the same as the phase difference of the first digital summing signal S11 and the second digital summing signal S12.

Figure 11:
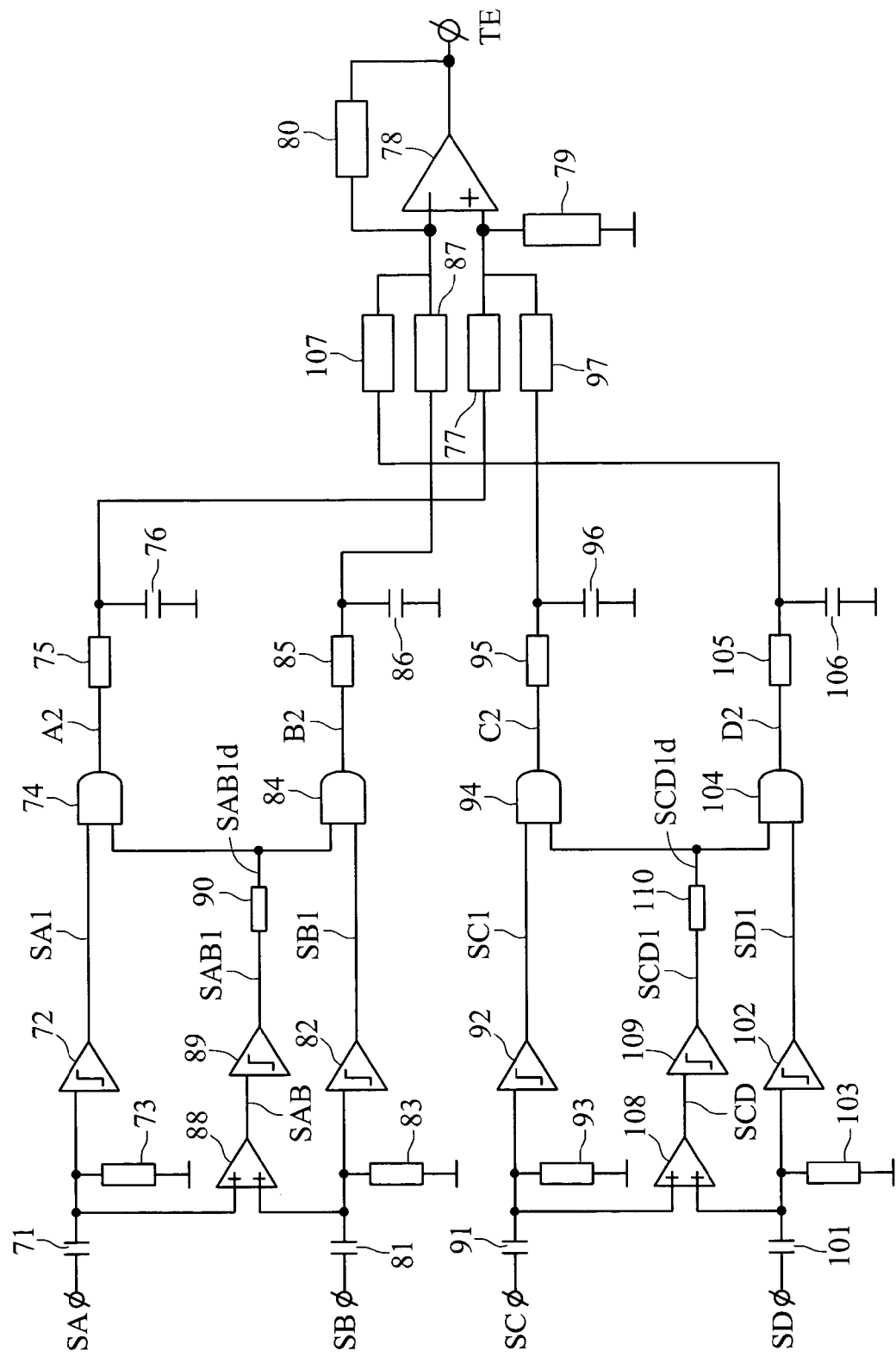
FIG. 11 is the block diagram of the circuit of the third preferred embodiment of the invention, which employs the DTD4 method.

FIG. 11 illustrates the circuit for tracking error signal detection, which employs DTD4: TE=[φ(A)−φ(B)]+[φ(C)−φ(D)] to obtain the tracking error signal TE. A first signal SA is input into the input of a slicer 72 via a capacitor 71, the input terminal of which couples a resistor 73 to the ground to generate a suitable slicing voltage level. The first digital signal SA1 from the slicer 72 is delivered to the first input of a logic comparator (AND) 74, which generates a first comparing signal A2. After a lowpass filer including a resistor 75 and a capacitor 76 deals with the first comparing signal A2, the signal A2 is then delivered to a positive terminal of a difference amplifier 78 via a resistor 77. The positive input of the difference amplifier 78 couples a resistor 79 to the ground. The signal from the difference amplifier 78 is the tracking error signal TE. The tracking signal TE is fed back to the negative terminal of the difference amplifier 78 via a resistor 80. Similarly, a second signal SB is digitized as a second digital signal SB1 via a capacitor 81, a slicer 82 and a resistor 83. The second digital signal SB1 is then input to a logic comparator 81, which generates a second comparing signal B2. Finally, the second comparing signal B2 is input into the negative terminal of the difference amplifier 78 via a lowpass filter including a resistor 85 and a capacitor 86, and a resistor 87.

The circuit in FIG. 11 further comprises an adder 88 for adding the signal SA and the signal SB such that a first summing signal SAB (SAB=SA+SB) is obtained. The first summing signal SAB is output as a first digital summing signal SAB1, which is then input into a delayer 90 to obtain a first delay signal SAB1$d$. The first delay signal SAB1$d$ is delivered to the second input terminal of the logical comparator 74 and the logical comparator 84.

A signal SC is input into the input of a slicer 92 via a capacitor 91, the input terminal of which couples a resistor 93 to the ground to generate a suitable slicing voltage level. The logic comparator 94 produces a third digital signal SC1, which is transmitted to the first input of a logic comparator (AND) 94. The logic comparator 94 generates a third comparing signal C2. After a lowpass filer including a resistor 95 and a capacitor 96 deals with the third comparing signal C2, the signal C2 is then delivered to a negative terminal of a difference amplifier 78 via a resistor 97. Similarly, a forth signal SD is digitized as a forth digital signal SD1 via a capacitor 101, a slicer 102 and a resistor 103. The fourth digital signal SD1 is then input into a logic comparator 104, which generates a fourth comparing signal D2. Finally, the fourth comparing signal D2 is input into the negative terminal of the difference amplifier 78 via a lowpass filter including a resistor 105 and a capacitor 106, and a resistor 107. The circuit further comprises an adder 108 for adding the third signal SC and the forth signal SD such that a second summing signal SCD (SCD=SC+SD) is obtained. The second summing signal SCD is output as a second digital summing signal SCD1, which is then input to a delayer 110 to obtain a second delay signal SCD1$d$. The second delay signal SCD1$d$ is delivered to the second input terminal of the logical comparator 94 and the logical comparator 104.

The first signal SA and the third signal SC are delivered to the positive input of the difference amplifier 78, while the second signal SB and the forth signal SD are delivered to the negative input of the difference amplifier 78. Therefore, the tracking error signal from the output of the difference amplifier 78 is as formula DTD4.

Figure 12:
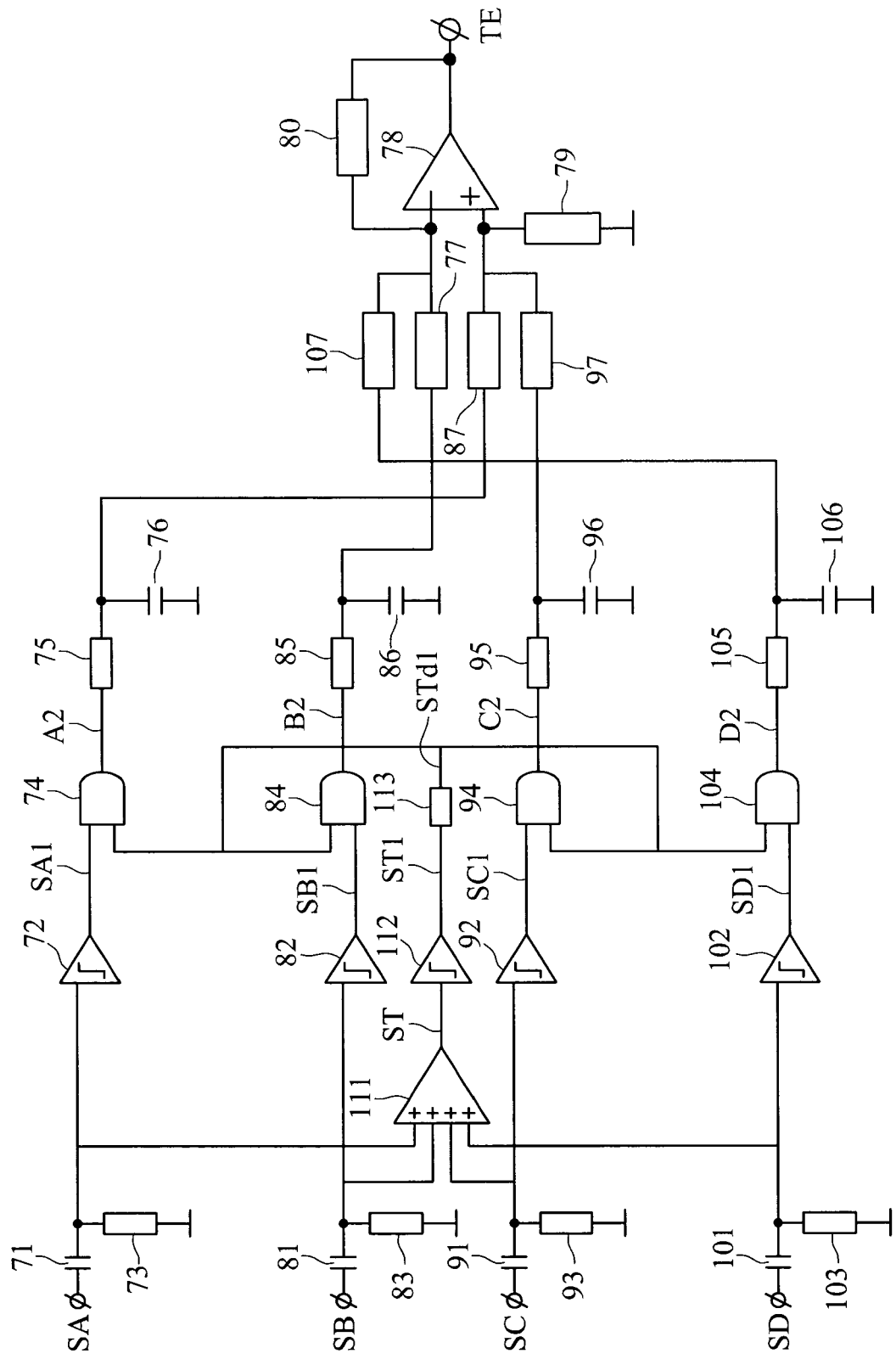
FIG. 12 is the block diagram of the circuit of the fourth preferred embodiment of the invention, which employs the DTD4 method

Finally, refer to FIG. 12, which illustrates another preferred embodiment of the invention employing DTD4: TE= $[\phi(A)-\phi(B)]+[\phi(C)-\phi(D)]$. The approach for obtaining the delay signal is different from the third preferred embodiment of FIG. 11. In this embodiment, the signals SA, SB, SC, and SD are delivered into only one adder 111 to obtain a summing signal ST, which is output as a digital summing signal ST1 via a slicer 112. After a delay signal ST1$d$ is obtained from a delayer 113, the delay signal ST1$d$ is then input into the logic comparators 74, 84, 94 and 104.

The disclosed method of the invention increases the usage range of the delay signal and simplifies the delay control. Furthermore, the required bandwidth of the phase comparator is lowered. The reliability of the tracking error signal is also improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A circuit for tracking error signal detection on an optical storage medium, the optical storage medium detecting the reflective beams form which through a plurality of photo detectors to generate a plurality of signals, thereby generating a first summing signal and a second summing signal in order to obtain a tracking error signal, the circuit comprising:
    a plurality of digitizers, for outputting the first summing signal and the second summing signal as a first digital summing signal and a second summing signal respectively, and outputting a third digital summing signal according to a third summing signal which is generated according to the first summing signal and the second summing signal;
    a delayer for generating a delay signal according to the third digital summing signal; and
    a plurality logic of comparators for outputting a first comparing signal after comparing the delay signal and the first digital summing signal, and a second comparing signal after comparing the delay signal and the second digital summing signal such that the tracking error signal is generated according to the first comparing signal and the second comparing signal.

2. The circuit of claim 1, wherein the digitizers further comprises a plurality of AC coupling capacitors, a plurality of registers and a plurality of slicers for coupling the first summing signal and the second summing signal respectively thereby generating the first digital summing signal and the second digital summing signal.

3. The circuit of claim 1, wherein the logic comparators are EXOR logic gates.

4. The circuit of claim 1, wherein the logic comparators are AND logic gates.

5. A circuit for tracking error signal detection on an optical storage medium, the optical storage medium detecting the reflective beams form which through a plurality of photo detectors to generate a plurality of signals, thereby obtaining a tracking error signal, the plurality of signals comprising a first signal, a second signal, a third signal and a fourth signal, the circuit comprising:
    a plurality of digitizers for outputting the first signal, the second signal, the third signal and the fourth signal as a first digital signal, a second digital signal, a third digital signal and a fourth digital signal respectively, and outputting a first digital summing signal and a second digital summing according to a first summing signal and a second summing signal respectively, wherein the first summing signal is generated according to the first signal and the second signal, the second summing is generated according to the third signal and the fourth signal;
    a plurality of delayers for generating a first delay signal and a second delay signal according to the first digital summing signal and the second digital summing signal respectively; and
    a plurality of logic comparators for comparing the first delay signal and the first digital signal, the first delay signal and the second digital signal, the second delay signal and the third digital signal, the second delay signal and the fourth digital signal respectively thereby outputting a first comparing signal, a second comparing signal, a third comparing signal and a fourth comparing signal, such that the tracking error signal is generated according to the first comparing signal, the second comparing signal, the third comparing signal and the fourth comparing signal.

6. The circuit of claim 5, wherein the digitizers further comprises a plurality of AC coupling capacitors, a plurality of registers and a plurality slicers for coupling the first signal, the second signal, the third signal and the fourth signal respectively thereby generating the first digital signal, the second digital signal, the third digital signal and the fourth signal.

7. The circuit of claim 5, wherein the logic comparators are AND logic gates.

8. A circuit for tracking error signal detection on an optical storage medium, the optical storage medium detecting the reflective beams form which through a plurality of photo detectors to generate a plurality of signals, thereby obtaining a tracking error signal, the plurality of signals comprising a first signal, a second signal, a third signal and a fourth signal, the circuit comprising:

a plurality of digitizers for outputting the first signal, the second signal, the third signal and the fourth signal as a first digital signal, a second digital signal, a third signal and a fourth signal respectively, and outputting a digital summing signal according to a summing signal, wherein the summing signal is generated according to the first signal, the second signal, the third signal and the fourth signal;

a delayer for generating a delay signal according to the digital summing signal; and a plurality of logic comparators for comparing the delay signal and the first digital signal, the delay signal and the second digital signal, the delay signal and the third digital signal, the delay signal and the fourth digital signal respectively thereby outputting a first comparing signal, a second comparing signal, a third comparing signal and a fourth comparing signal, such that the tracking error signal is generated according to the first comparing signal, the second comparing signal, the third comparing signal and the fourth comparing signal.

9. The circuit of claim 8, wherein the digitizers further comprises a plurality of AC coupling capacitors, a plurality of registers and a plurality slicers for coupling the first signal, the second signal, the third signal and the fourth signal respectively thereby generating the first digital signal, the second digital signal, the third digital signal and the fourth signal.

10. The circuit of claim 8, wherein the logic comparators are AND logic gates.

* * * * *